(12) United States Patent
Terakawa et al.

(10) Patent No.: US 9,096,224 B2
(45) Date of Patent: Aug. 4, 2015

(54) HYBRID VEHICLE CLUTCH CONTROL DEVICE

(75) Inventors: Tomomitsu Terakawa, Anjo (JP); Yasuhiro Hosoi, Chiryu (JP); Yuichiro Kitamura, Nagoya (JP); Yoshihide Suzuki, Toyoake (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/983,479

(22) PCT Filed: Mar. 9, 2012

(86) PCT No.: PCT/JP2012/056076
§ 371 (c)(1),
(2), (4) Date: Aug. 2, 2013

(87) PCT Pub. No.: WO2012/128065
PCT Pub. Date: Sep. 27, 2012

(65) Prior Publication Data
US 2013/0310217 A1   Nov. 21, 2013

(30) Foreign Application Priority Data

Mar. 24, 2011   (JP) .................................. 2011-066161

(51) Int. Cl.
*B60W 10/02*   (2006.01)
*F16D 48/02*   (2006.01)
(Continued)

(52) U.S. Cl.
CPC .................. *B60W 20/40* (2013.01); *B60K 6/48* (2013.01); *B60K 6/547* (2013.01); *B60L 7/14* (2013.01);
(Continued)

(58) Field of Classification Search
CPC ................. F16D 2048/0227; F16D 2048/0251
USPC .......................................................... 477/86
See application file for complete search history.

(56) References Cited

U.S. PATENT DOCUMENTS

2001/0022245 A1*   9/2001   Rogg .......................... 180/65.2
2002/0082134 A1    6/2002   Hirt et al.
(Continued)

FOREIGN PATENT DOCUMENTS

CN   101956824 A   1/2011
CN   101962016 A   2/2011
(Continued)

OTHER PUBLICATIONS

U.S. Appl. No. 13/983,439, filed Aug. 2, 2013, Terakawa et al.
(Continued)

*Primary Examiner* — Ramya Burgess
*Assistant Examiner* — Lillian Nguyen
(74) *Attorney, Agent, or Firm* — Buchanan Ingersoll & Rooney PC

(57) ABSTRACT

The clutch control device for a hybrid vehicle comprises an engine, an automated manual transmission, a clutch device and a clutch actuator concluding an output rod and a master cylinder which generates a hydraulic pressure therein by closing an idle port in response to the stroke of the output rod, a slave cylinder in fluid communication with the master cylinder through a passage and controlling the clutch device to be in engagement state or disengagement state operated by the hydraulic pressure generated by the master cylinder and a clutch engagement state holding control portion for temporarily holding the clutch device to be in the engagement state by operating the master cylinder to close the idle port after the engagement state under the vehicle being running under a motor drive mode continued for a predetermined time.

11 Claims, 5 Drawing Sheets

(51) Int. Cl.
  B60W 20/00  (2006.01)
  B60K 6/48   (2007.10)
  B60K 6/547  (2007.10)
  F16D 29/00  (2006.01)
  B60L 15/20  (2006.01)
  B60L 7/14   (2006.01)
  B60L 11/14  (2006.01)

(52) U.S. Cl.
  CPC ............. *B60L 11/14* (2013.01); *B60L 15/2009* (2013.01); *B60L 15/2054* (2013.01); *B60W 10/02* (2013.01); *B60W 20/00* (2013.01); *F16D 29/005* (2013.01); *F16D 48/0206* (2013.01); *B60K 2006/4808* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/507* (2013.01); *B60L 2240/80* (2013.01); *B60L 2270/145* (2013.01); *B60Y 2400/4242* (2013.01); *F16D 2048/026* (2013.01); *Y02T 10/626* (2013.01); *Y02T 10/6221* (2013.01); *Y02T 10/642* (2013.01); *Y02T 10/70* (2013.01); *Y02T 10/7077* (2013.01); *Y02T 10/7241* (2013.01); *Y02T 10/7275* (2013.01); *Y02T 90/16* (2013.01); *Y10S 903/902* (2013.01); *Y10T 477/26* (2015.01)

(56) References Cited

U.S. PATENT DOCUMENTS

2008/0070745 A1    3/2008   Ogata
2009/0253551 A1   10/2009   Foster
2009/0312144 A1   12/2009   Allgaier et al.
2011/0021312 A1    1/2011   Fukitani

FOREIGN PATENT DOCUMENTS

DE    102007042772 A1 *   4/2008
DE    102008002383 A1    12/2009
JP    2008-075814 A       4/2008
WO    2009/109822 A1      9/2009

OTHER PUBLICATIONS

U.S. Appl. No. 13/983,517, filed Aug. 2, 2013, Terakawa et al.

International Search Report (PCT/ISA/210) issued on Apr. 17, 2012, by the Japanese Patent Office as the International Searching Authority for International Application No. PCT/JP2012/056076.

Chinese First Office Action dated Apr. 13, 2015 issued in the corresponding Chinese Patent Application No. 2015040801120470 and English translation (12 pages).

* cited by examiner

HYBRID VEHICLE CLUTCH CONTROL DEVICE

TECHNICAL FIELD

This invention relates to a clutch control device for a hybrid vehicle provided with an engine and an automated clutch device to secure the relationship between the clutch actuator operating amount and the clutch torque regardless of the generation of heat expansion or heat contraction of an operating oil.

BACKGROUND OF THE TECHNOLOGY

Conventionally, in a vehicle having an engine as a source of driving force, an automated manual transmission (hereinafter referred to as an AMT) has been known. According to the AMT, various actuators are added to an existing manual transmission (gear shifting transmission) for automatically operating a series of gear shifting operations such as clutch engagement/disengagement, gear shifting, gear selecting, in response to an intension or request of an operator of the vehicle or depending on a vehicle running state.

In such AMT, when the clutch is disengaged, first, master cylinder is operated by a clutch actuator, of which drive source is a motor and by the operation of the master cylinder, an idle port is closed to operate a friction clutch slave cylinder (hydraulic direct cylinder). Then the diaphragm spring is deformed by the operation of the slave cylinder to reduce the pressurized load of the clutch disc which is applied on the flywheel. In other words, under the clutch being in disengagement state, the idle port of the master cylinder is closed to interrupt the fluid communication between the master cylinder and the slave cylinder by closing a communication passage provided therebetween.

DOCUMENT LIST OF STATE OF ART

Patent Document

Patent Document 1: JP2008-75814 A

DISCLOSURE OF INVENTION

Problems to be Solved

However, when applying the technology disclosed in the Patent Document 1 to a hybrid vehicle which includes both the engine and the motor/generator (which is a motor generating a drive force to be transmitted to the drive wheels using an electric power accumulated in the battery and regenerating the electric power by being driven by the drive wheels during regeneration operation) at the time of vehicle being running only by the motor torque from the motor/generator, the clutch device is in disengagement state, wherein the engine and a transmission are not connected. If such clutch disengagement state continues for a certain period of time, the operating oil sealed into the communication passage generates thermal expansion or contraction by the change of the ambient temperature. Therefore, even the master cylinder is in non-operated state, the slave cylinder is operated, which may vary the relationship between the clutch actuator operating amount and the clutch torque.

As explained above, when the relationship between the clutch actuator operating amount and the clutch torque varies, the clutch engagement or disengagement operation under the shifting operation of the AMT would not be timely performed as desired or as intended. For example, when the clutch disengagement time exceeds the intended or desired time period, the operator of the vehicle feels that the engine has been stalled, derived from the non-torque transmission from the engine to the vehicle wheels during the clutch being in disengagement state. Further, when the clutch disengagement operation time continues for a long time period, the engine receiving no load may generate a shifting shock due to an excessive rise of engine rotation speed (rpm) relative to the input shaft rotation speed (rpm) of the AMT which causes a great difference in rotation therebetween.

The present invention was made in consideration with the above problems and the object of the invention is to provide a clutch control device for a hybrid vehicle which can improve clutch control accuracy by temporarily engaging the clutch device in case a clutch disengaged state continues for a longer time than a predetermined time period.

Means for Solving the Problem

The clutch control device for a hybrid vehicle includes an automated manual transmission which transmits a rotation of an input shaft adapted to be rotated by an engine torque outputted from an engine mounted on the hybrid vehicle to a drive wheel of the vehicle by changing a rotation speed of the input shaft to a plurality of speed stages with a plurality of speed change ratios, a motor connected to the drive wheel of the vehicle, a clutch device for engaging the output shaft of the engine with the input shaft of the automated manual transmission or disengaging the output shaft of the engine from the input shaft of the automated manual transmission and controlling a clutch torque transmitted to the input shaft of the automated manual transmission from the output shaft to be a target clutch torque, a clutch actuator including an output rod displaced by an actuator and a master cylinder generating a hydraulic pressure therein by closing an idle port communicating with a reservoir by a displacement of the output rod, a slave cylinder in communication with the master cylinder through a communication passage and operated by the hydraulic pressure generated by the master cylinder to operate the clutch device to be in engagement state or disengagement state and a clutch engagement state holding control portion for holding the clutch device to be temporarily in engagement state by operating the master cylinder to be in an idle port opening direction when the disengagement state of the clutch device continues for a predetermined time period.

BRIEF EXPLANATION OF ATTACHED DRAWINGS

THE EMBODIMENTS FOR IMPLEMENTING THE INVENTION

Figure 1:
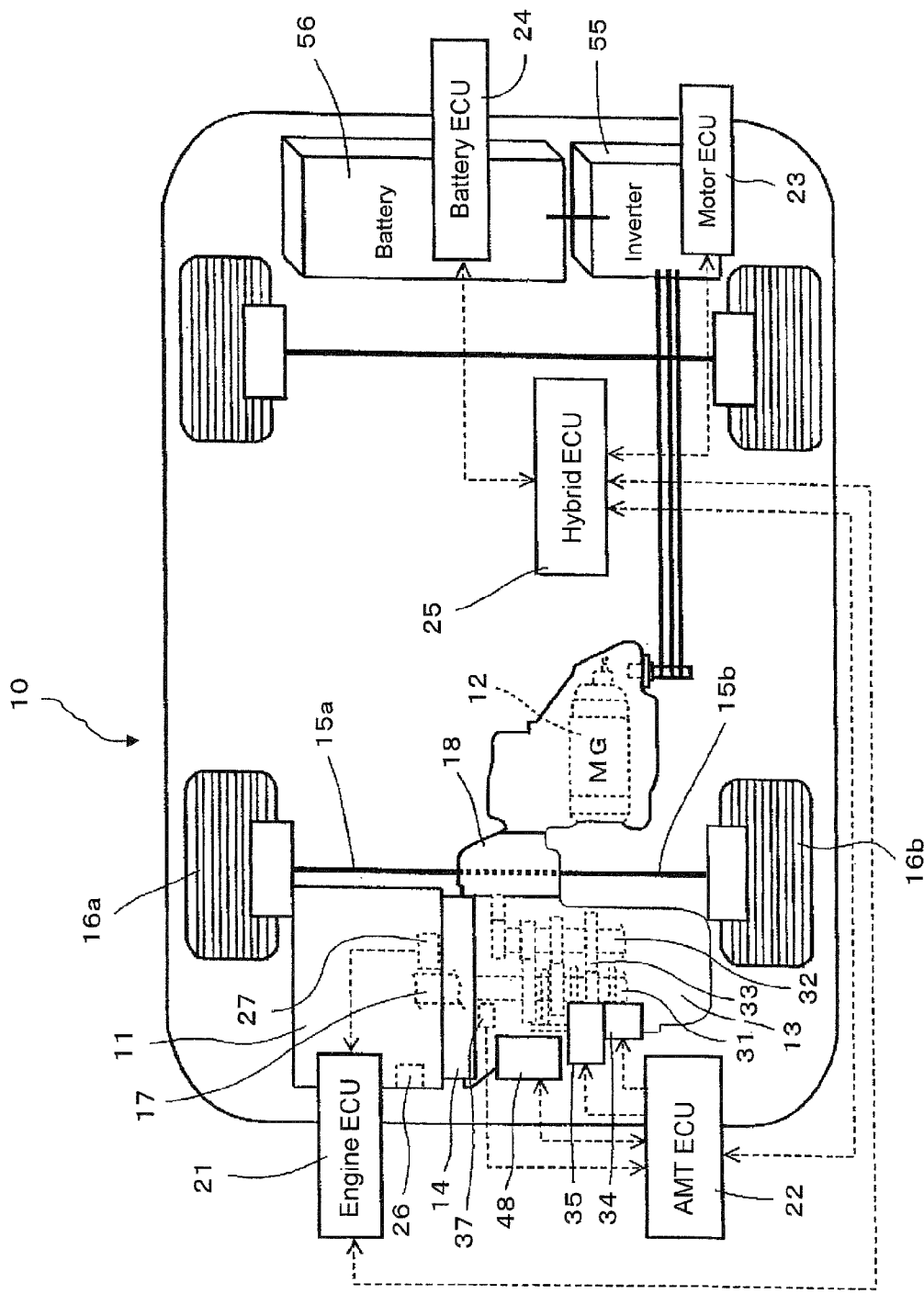
FIG. 1 is a schematic structural view of a hybrid vehicle including a clutch control device according to an embodiment of the invention.

The embodiments of the clutch control device associated with the present invention will be explained with reference to the attached drawings. In FIG. 1, the hybrid vehicle 10 is provided with an engine 11 as a driving source and a motor/generator 12 (corresponding to the motor of the invention). The drive wheels 16a and 16b of the hybrid vehicle 10 is driven by either one or both of the engine 11 and the motor/generator 12. The hybrid vehicle 10 is further provided with an automated manual transmission 13 and a clutch device 14, etc.

Figure 2:
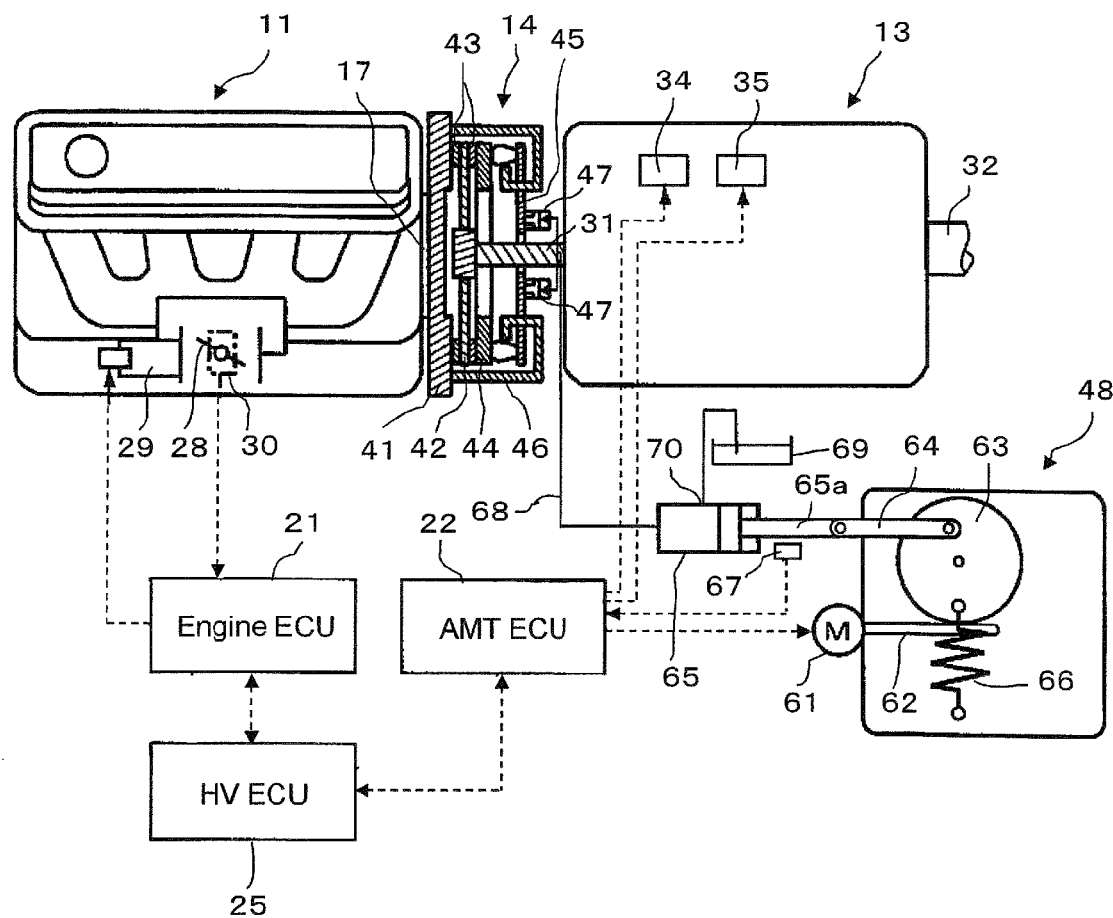
FIG. 2 is a schematically illustrated structure of engine, automated manual transmission and the clutch device.

FIG. 2 is a schematic view of the engine 11, automated manual transmission 13 and the clutch device 14 shown in FIG. 1 and the arrows of the dotted lines connecting the devices indicates the control flow direction.

The engine 11 is, as shown in FIG. 1, transversely installed in the vehicle at the front side of axle shafts 15a and 15b of the drive wheels 16a and 16b. The engine 11, the clutch device 14 and the automated manual transmission 13 are installed in the vehicle in this order in a width direction of the vehicle. A common rotation shaft line from the output shaft 17 of the engine 11 to the input shaft 31 of the automated manual transmission (AMT) 13 is used. An engine rotation speed sensor 27 of a non-contact type is provided in the vicinity of the output shaft 17 of the engine 11 for detecting the engine rotation speed (rpm). As schematically illustrated in FIG. 2, the engine 11 is provided with a throttle valve 28 for adjusting the air intake amount and an injector (not shown) for adjusting the fuel supply amount relative to the air intake amount. Further, the engine is provided with a throttle actuator 29 for adjusting the opening degree of the throttle valve 28 and a throttle sensor 30 for detecting the throttle opening degree.

The clutch device 14 is hydraulically operated dry type, single plate type friction clutch and the clutch device 14 is formed by a flywheel 41, clutch disc 42, clutch facing 43, pressure plate 44, diaphragm spring 45, clutch cover 46, slave cylinder (hydraulic direct type cylinder) 47 and a clutch actuator 48. As shown in FIG. 2, the flywheel 41 is formed by a thick disc plate having a mass which can sufficiently maintain the generated inertia and is coaxially fixed to the output shaft 17 of the engine 11. The clutch cover 46 is of approximately cylindrical shape and is formed upright from a side of the flywheel 41 opposite to the engine at an outer peripheral portion towards the axis line. The clutch disc 42 of a disc plate shape is arranged inside of the clutch cover 46 and adjacently arranged to the flywheel 41. The clutch disc 42 is in spline connection with the input shaft 31 of the AMT 13 at the central portion for unitary rotation therewith and the clutch facing 43 is adhered to both sides of the clutch disc 42 at the outer peripheral portion thereof. The pressure plate 44 of approximately ring shape is axially movably provided adjacent to the clutch disc 42. The diaphragm spring 45 and the annular shape slave cylinder 47 are provided for moving the pressure plate 44.

Further, a clutch driving mechanism, the clutch actuator 48 is provided for operating the slave cylinder 47. The clutch actuator 48 is formed by a DC motor 61 (corresponding to the actuator of the invention), a reduction gear mechanism 62 having worm gears, output wheel 63, output rod 64, master cylinder 65, assist spring 66 and a stroke sensor 67.

When the DC motor 61 of the clutch actuator 48 is driven to be rotated, the output wheel 63 is rotated via the reduction gear mechanism 62 and the output rod 64 is moved forward (left side as viewed in FIG. 2) or moved rearward (right side as viewed in FIG. 2). By this movement of the output rod 64, a piston rod 65a which is connected to the output rod 64 through a pivot pin to generate a hydraulic pressure in the master cylinder 65.

The hydraulic pressure generated in the master cylinder 65 is transmitted to the slave cylinder 47 via a communication passage 68 to drive the pressure plate 44 in an axial line direction by the diaphragm spring 45. Then the pressure plate 44 pressurizes the clutch disc 42 by sandwiching thereof with the flywheel 41 to slidably rotate the clutch disc 42 relative to the flywheel 41 thereby varying the pressurized load of the clutch facings 43 of the clutch disc 42. The assist spring 66 assists a rearward returning of the output rod 64 and the stroke sensor 67 detects the stroke amount Ma of the output rod 64.

An idle port 70 is provided at the master cylinder 65 of the clutch actuator 48 and is opened to the reservoir 69. The idle port 70 is opened when the clutch device 14 is in engagement state, in other words, when the piston rod 65a of the master cylinder 65 is in a right side end position (the retreated end position) in FIG. 2 and the communication passage 68 is in fluid communication with the reservoir 69 through the idle port 70. On the other hand, the idle port 70 is closed when the piston rod 65a of the master cylinder 65 is moved to a left side end position (the advanced end position) in FIG. 2 and the communication of the passage 68 with the reservoir 69 through the idle port 70 is interrupted. Due to this closing of the idle port 70, the hydraulic pressure generated by the operation of the master cylinder 65 is transmitted to the slave cylinder 47 via the communication passage 68 to keep the clutch device 14 in the disengagement state.

Figure 3:
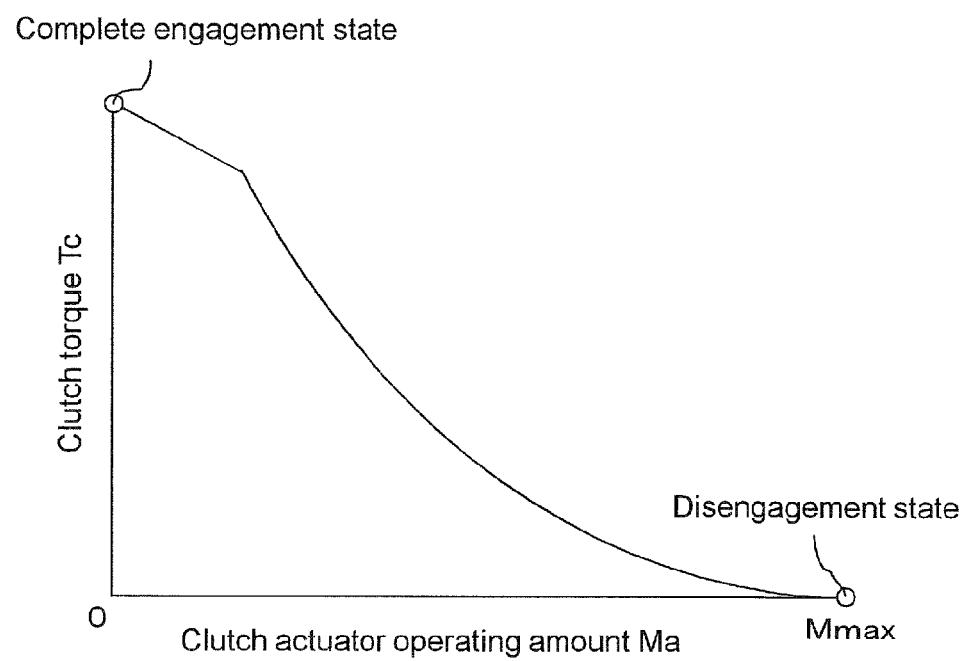
FIG. 3 is a map of the relationship between the clutch torque and the clutch actuator operating amount.

The clutch device 14 changes over the connection between the output shaft 17 of the engine 11 and the input shaft 31 of the AMT 13 from the rotational connection state to the disconnected state or vice versa. The connecting operation between the output shaft 17 of the engine 11 and the input shaft 31 of the AMT 13 can be performed by an adjustable clutch torque Tc. FIG. 3 shows an example of the performance characteristics of torque transmitting performance of the clutch device 14. In FIG. 3, the horizontal axis indicates the operating amount of the clutch actuator 48, i.e., the stroke Ma of the output rod 64 and the vertical axis indicates the clutch torque Tc that can be transmitted. The clutch device 14 is a normally engaged type clutch in which the clutch torque Tc becomes the maximum amount when completely engaged under the condition that the operating amount Ma equals to zero (Ma=0). According to this normally engaged type clutch, the clutch torque Tc under the half clutch state decreases as the operating amount Ma increases and when the operating amount Ma becomes the maximum value of Mmax the clutch is disengaged.

The automated manual transmission (AMT) 13 is a type of automatic transmission by adding actuators to a manual transmission which selectively engages one of a plurality of gear trains by a manual shifting operation of a shift lever by an operator of the vehicle so that the manual shifting operation can be automatically performed by the added actuators. As shown in the dotted line in FIG. 1, the AMT 13 indicates a parallel-axis gear wheel engagement type where the plurality of gear trains 33 forming five advance speed stages and one reverse speed stage is disposed between the input shaft 31 and the output shaft 32 which are arranged in parallel with each other. The input shaft 31 is rotatably driven by the engine torque outputted from the engine 11 through the clutch device 14. The rotation speed sensor 37 is provided in the vicinity of the input shaft 31 for detecting an input rotation speed inputted to the input shaft 31. The output shaft 32 is connected to the input side of the differential gear device 18 arranged in the middle portion in width direction of the vehicle and rotatably connected to the drive wheels 16a and 16b through the differential gear device 18.

Further, as shown in FIGS. 1 and 2, the AMT 13 includes a shift actuator 34 and a select actuator 35 as the gear shifting mechanism which selectively engages one of the gear trains 33. The shift actuator 34 and the select actuator 35 are driven by a known method disclosed in as an example a JP2004-176894A and accordingly the detail explanation thereof will be omitted in the application.

The motor/generator 12 is installed in the vehicle at the rear side of the axle shafts 15a and 15b of the drive wheels 16a and 16b. The motor/generator 12 is a three-phase DC rotary machine generally used for the hybrid vehicle. The output shaft (not shown) of the motor/generator 12 is rotatably connected to the input side of the differential gear device through a reduction gear mechanism (not shown) and accordingly, the output shaft of the motor/generator 12 is rotatably connected to both the output shaft 32 of the MT 13 and the drive wheels 16a and 16b.

In order to drive the motor/generator 12, an inverter 55 and a battery 56 are installed in the rear side of the vehicle 10. The inverter 55 is connected to the motor/generator 12 and the battery 56 as well. The inverter 55 has a DC/AC converting function for converting the DC electric power outputted from the battery 56 into the frequency variable AC electric power and supplying the motor/generator with the converted AC electric power and at the same has an AC/DC converting function for converting the AC electric power generated at the motor/generator 12 into the DC electric power and charging the battery 56 thereby. The battery 56 may be used as the exclusive use for driving the vehicle or may be used commonly for other purposes.

The motor/generator 12 functions as the motor when the AC electric power is supplied and generates assist torque which can be added to the engine torque to assist driving operation of the drive wheels 16a and 16b. Further, the motor/generator 12 functions as the generator to charge the battery 56 when driven by a generator torque which is a portion of the engine torque Te.

In order to control the hybrid vehicle 10, a plurality of ECUs (Electronic Control Units) is used. As shown in FIG. 1, engine ECU 21, AMT ECU 22, motor ECU and battery ECU are provided. Further, the hybrid vehicle 10 includes a hybrid ECU 25 which controls the overall hybrid vehicle 10. The ECUs 21 through 24, each of which controls each portion in charge are connected to the hybrid ECU 25 through CAN and necessary information is exchanged mutually and the information is managed and controlled by the hybrid ECU 25. Each ECU 21 through 25 includes CPU portion for performing calculation processing, a memory portion with ROM and RAM which memorizes and stores programs and maps and an input/output portion for exchanging the information.

The hybrid ECU 25 includes a mode selecting portion which selects the running mode and the speed stage at the selected running mode of the hybrid vehicle 10. The selecting portion selects a suitable vehicle running mode in considering the battery charge state detected by a battery charge state detecting sensor (not shown), a vehicle speed detected by a vehicle speed sensor (not shown), acceleration pedal operating amount detected by an acceleration pedal operation detecting sensor (not shown) and a brake pedal operating amount detected by a brake pedal operation detecting sensor (not shown).

According to the embodiment of the invention, the hybrid vehicle 10 includes a motor drive mode under the engine being stopped (hereinafter, referred to as EV mode) in which only the motor torque of the motor/generator 12 is transmitted to the drive wheels 16a and 16b, an engine mode in which only the engine torque from the engine 11 is transmitted to the drive wheels 16a and 16b, a parallel mode in which motor torque from the motor/generator 12 and the engine torque from the engine 11 are transmitted to the drive wheels 16a and 16b in parallel and a motor drive mode under engine being operated (hereinafter referred to as series mode) in which only the motor torque from the motor/generator 12 is transmitted to the drive wheels 16a and 16b and the accessories such as the compressor of the air conditioner (not shown) and alternator are driven by the engine torque from the engine 11. One of the above running modes is selected by the mode selecting portion.

Engine ECU 21 drives the starter 26 (See FIG. 1) in response to the ignition switch operation to start the engine 11. The engine ECU 21 obtains the signal indicating the engine rotation speed at the output shaft 17 by the engine rotation speed sensor 27 and obtains the signal indicating the throttle opening degree by the throttle sensor 30. The engine ECU 21 sends the command to the throttle actuator 29 to open and close the throttle valve 28 by watching the engine rotation speed of the output shaft 17. Further, the engine torque and the engine rotation speed are controlled by controlling the injector (not shown). It is noted here that the engine rotation speed is controlled by the command from the hybrid ECU 25 in priority not only by the control of the depression amount of the acceleration pedal by the operator of the vehicle.

The AMT ECU 22 is controlled by association with the operation of the clutch device 14 and the AMT 13 to perform a gear shifting operation. The AMT ECU 22 drives the DC motor 61 of the clutch actuator 48 to control the clutch torque Tc which is transmittable and then obtains the signal indicating the operating amount of the output rod 64 by the stroke sensor 67 thereby to confirm the clutch torque amount Tc at that moment. Further, the AMT ECU 22 obtains the input shaft rotation speed by the rotation speed sensor 37 of the AMT 13 and drives the shift actuator 34 and the select actuator 35 to select one of the gear trains 33 to be in engagement to perform a gear shifting operation to obtain a selected speed stage.

According to the hybrid vehicle 10 thus structured, when the EV mode is selected for example, by the node selecting portion of the hybrid ECU 25, the motor/generator 12 is activated and the drive wheels 16a and 16b are driven by the motor torque of the motor/generator 12. When the engine mode is selected, ignition switch is activated to be ON and the clutch device 14 is kept to be in clutch engagement state. Under this state, the engine torque of the engine 11 is transmitted to the AMT 13 via the clutch device 14 to drive the drive wheels 16a and 16b via the selected gear train 33. Further, when the parallel mode is selected, the motor/generator 12 is activated and at the sme time the engine 11 is activated to drive the vehicle by both motor torque and engine torque of the motor/generator 12 and the engine 11, respectively. On the other hand, when the series mode is selected, motor/generator 12 is activated and the engine 11 is rotated with an idling rotation speed. The motor torque only is transmitted to the drive wheel 16a and 16b and the compressor for air conditioner and the alternator are driven by the idling rotation speed of the engine.

Figure 6:
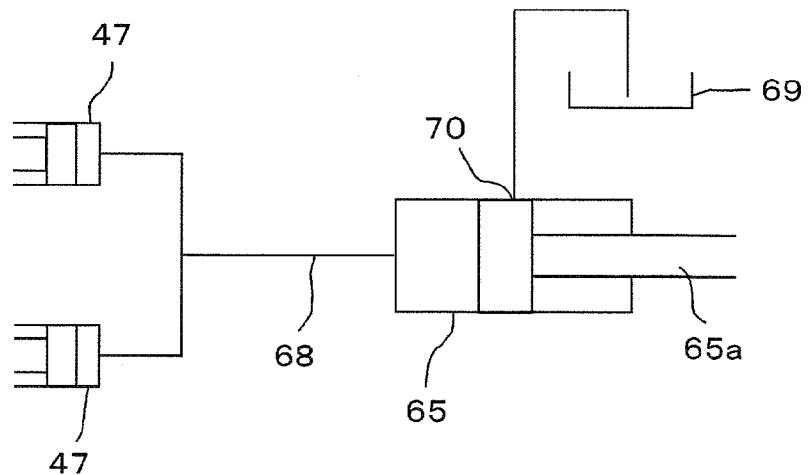
FIG. 6 is an operating state of FIG. 5.

According to the running mode of EV mode or series mode, when the vehicle 10 is running, the clutch device 14 is kept to be in a disengagement state to maintain the closing of the communication passage 68 between the master cylinder 65 and the slave cylinder 47 (See FIG. 6). Accordingly, if the time for keeping the closing condition continues for a long time (such as for example ten minutes or longer), the operating oil in the passage 68 becomes thermally expanded or contracted to thereby change the relationship between the master cylinder 65 and the slave cylinder 47.

In other words, when the closing state of the passage 68 continues for excessively longer time, the ambient temperature changes, or the temperature of the operating oil in the passage 68 rises by the heat generated due to the frictional sliding of the clutch disc 42 generated during the vehicle running. This may thermally expand the operating oil in the passage 68. On the other hand, if the vehicle running is changed to the motor/generator driving from the engine driving, the engine may be cooled down to drop the temperature of the operating oil in the passage 68 and the operating oil in the passage 68 may be thermally contracted. Accordingly, even the master cylinder 65 is not operated, the slave cylinder 47 may be inadvertently operated to change the relationship between the operating amount of the clutch actuator 48 and the clutch torque relative thereto.

Accordingly, according to the embodiment of the invention, when the closing state of the communication passage 68 continues for a longer time, the master cylinder 65 is reset to open the idle port 70 to establish communication between the passage 68 and the reservoir 69 to secure the relationship between the clutch torque and the operating amount of the clutch actuator 48 affected by the thermal expansion or the thermal contraction of the operating oil.

Figure 4:
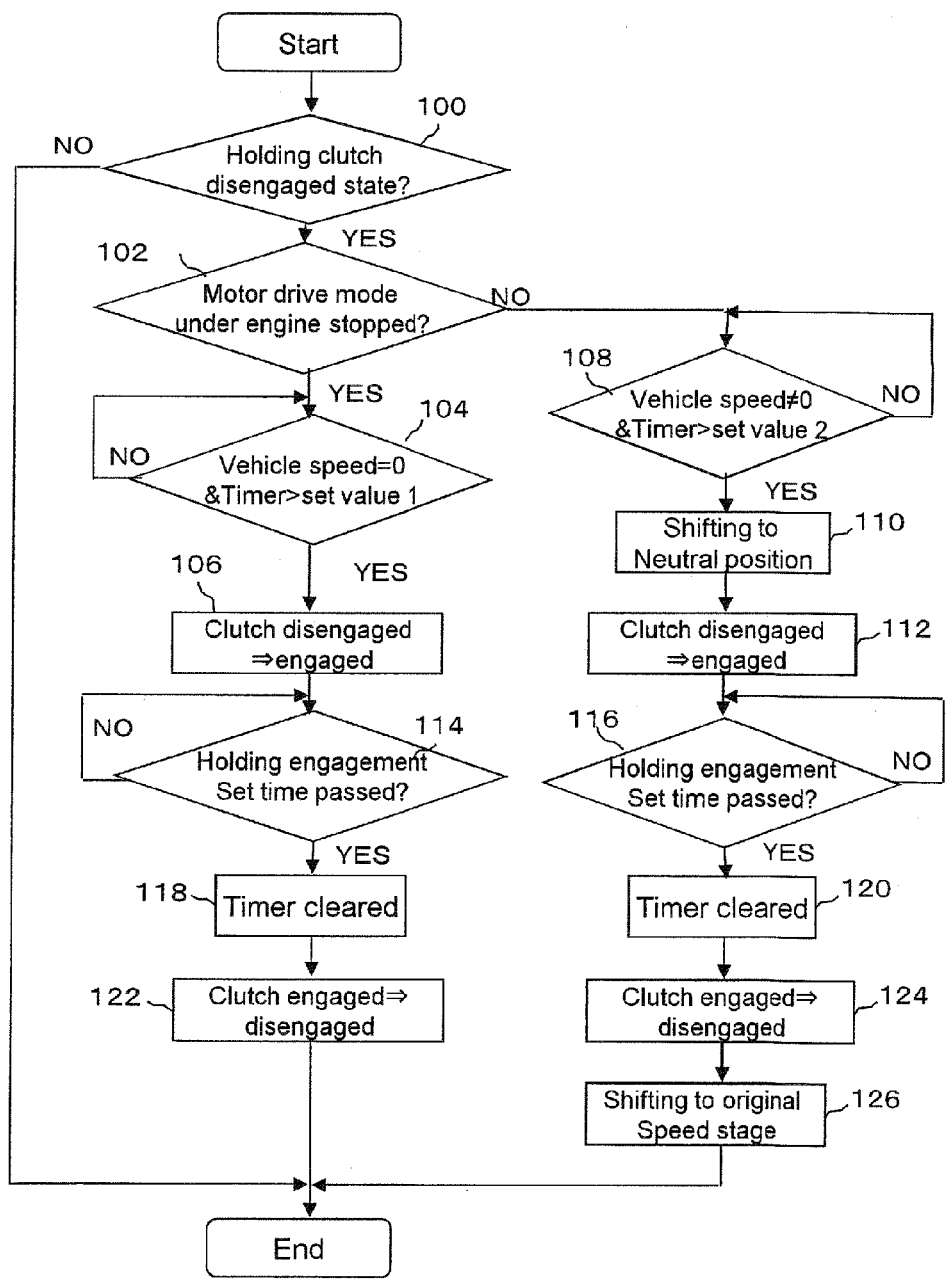
FIG. 4 is a flowchart showing the controlled state of the clutch device according to the embodiment of the invention.

The clutch control operation of the clutch device 14 according to the embodiment will be explained with reference to the flowchart shown in FIG. 4.

Figure 5:
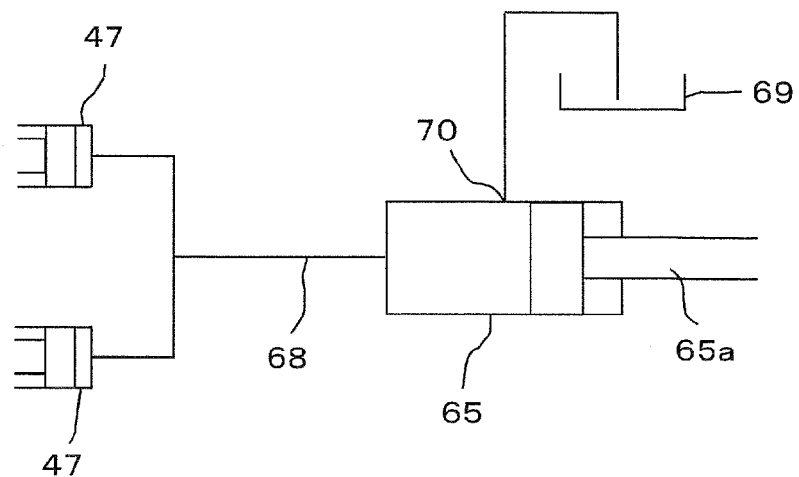
FIG. 5 is a partially enlarged view of FIG. 2, showing the connecting state between the master cylinder and the slave cylinder.

First, at the step 100, it is judged whether the clutch device is in disengagement state or not. If the clutch device is kept to be in engagement state (NO in the flowchart), the program goes to end the processing, as shown in FIG. 5, since the idle port 70 of the master cylinder 65 is open and no thermal expansion or contraction occurs for the operating oil in the passage 68 and accordingly, no change of the relationship between the clutch actuator operating amount and the clutch torque is made.

On the other hand, if the clutch device 14 is kept to be in disengagement state (in case of YES in the flowchart), the program goes to the step 102 and at the step 102, it is judged whether the running mode of the vehicle is motor running mode under the engine being stopped (EV mode) or not. If the result of the judgment is YES, the program goes to the step 104 and at the step 104, it is further judged whether the vehicle speed is zero and the clutch disengagement state continued for a predetermined time t1. If the result of the judgment is YES (the vehicle speed is zero and the disengagement state continued for the predetermined time t1), at the following step 106, a command that the clutch actuator 48 should operate the clutch device 14 to be in the engagement state.

Then the DC motor 61 is driven to rotate the output wheel 63 in a clockwise direction as viewed in FIG. 2 via the reduction gear mechanism 62. By the rotation of the output wheel 63 in the clockwise direction, the master cylinder 65 is moved in a right direction as viewed in FIG. 2 and the idle port 70 is opened by this movement of the master cylinder 65 to establish the communication between the communication passage 68 and the reservoir 69. Thus the hydraulic pressure in the slave cylinder 47 is decreased and the pressure plate 44 is pressed by the diaphragm spring 45 to increase the pressurized load of the clutch disc 42 on the flywheel 41. Thus the clutch device 14 is kept to be in engagement state.

Under this operation, when the master cylinder 65 is moved in a right direction as viewed in FIG. 2, the idle port 70 of the master cylinder 65 is opened and the fluid communication between the passage 68 and the reservoir 69 is established. This can prevent the clutch torque change relative to the operating amount of the clutch actuator 48 caused by the thermal expansion or the contraction of the operating oil in the passage 68 and accordingly, the accuracy of the clutch control can be improved. As described, by controlling the clutch device 14 to be in engagement state from the disengagement state, the relationship between the operating amount of the clutch actuator 48 and the clutch torque can be improved regardless of the occurrence or generation of the thermal change of the operating oil.

On the other hand, at the step 102, if the running mode of the vehicle is judged not to be the motor drive mode under the engine being stopped (in case of the judgment result is "NO"), in other words, the running mode is judged to be the motor drive under the engine being operated, then the program goes to the step 108 and at the step 108, it is judged whether the vehicle speed is not zero (Vehicle speed≠0) and the disengagement state of the clutch device 14 continued for the predetermined time t2. If it is judged that the vehicle speed is not zero and the disengagement state continued for the predetermined time t2, at the flowing step 110, the AMT 13 is shifted to a neutral position and at the step 112, a command that the clutch actuator 48 should operate the clutch device 14 to be in the engagement state.

Then the DC motor 61 is driven to rotate the output wheel 63 as explained above, the master cylinder 65 is operated via the reduction gear mechanism and the output wheel 63 to open the idle port 70 by this movement of the master cylinder 65 to establish the communication between the communication passage 68 and the reservoir 69. Thus the clutch device 14 is kept to be in engagement state. Under this situation, even the clutch device 14 is in engagement state, since the AMT 13 is shifted in the neutral position, the engine torque from the engine 11 is not transmitted to the drive wheels 16a and 16b through the clutch device 14 and the AMT 13.

By the processing of the steps 106 and 112, a clutch engagement state holding control portion is formed and when the clutch disengagement state continues for a predetermined time, clutch engagement state holding control portion controls the clutch device 14 to be temporarily kept to the engagement state.

At the steps 114 and 116, if it is judged that the engagement state of the clutch device 14 continued for the predetermined time, at the steps 118 and 120, the timer is updated and a command that the clutch device 14 should be in disengagement state is sent to the clutch actuator 48.

By this command, the EDC motor 61 is operated in the opposite direction to the direction explained above and the master cylinder 65 is moved in the left direction as viewed in FIG. 2 to close the idle port 70 and operates the slave cylinder 47 of the clutch device 14 via the passage 68. Then the diaphragm spring 45 is operated through the slave cylinder 47 to reduce the pressurized load if the clutch disc 42 on the flywheel 41 is reduced and the clutch device 14 returns to the original disengagement state.

Under the motor drive mode under the engine being stopped, when the clutch device 14 is kept to be in disengagement state (at the step 122), the program ends however, on the other hand, under the motor drive mode under the engine being operated, when the clutch device 14 is kept in disengagement state (step 124), at the step 126, the AMT 13 is shifted from the neutral position to the original shift position before shifted to the neutral position. Then the program ends.

According to the embodiment of the invention, when the disengagement state of the clutch device 14 is continued for a predetermined time, the clutch device 14 is temporarily kept to the engagement state and after the predetermined time passed, the clutch device 14 is returned to the original disengagement state. Accordingly, the relationship between the operating amount Ma of the clutch actuator 48 and the clutch torque Tc relative to the operating amount can be always kept to be the originally intended relationship as shown in FIG. 3 regardless of the thermal expansion or contraction of the operating oil in the passage 68 which connects the master cylinder 65 and the slave cylinder 47. Therefore, the clutch control accuracy can be stably secured.

Further, when the vehicle running mode is the series mode, the clutch device 14 is engaged after the AMT 13 is shifted to a neutral position, even under the engine 11 is driven, the engine 11 and the drive wheels 16a and 16b are not connected and when the vehicle is under the EV mode, the clutch device 14 is engaged under the condition that the hybrid vehicle 10 is stopped and accordingly, even the AMT is in the first speed stage, no problem occurs such as inadvertent starting of the vehicle.

It is noted that the AMT is explained as the parallel axis gear wheel engagement type, but a planetary gear wheel type may be used.

Although the invention is explained with the embodiments above, it is not limited to the embodiments explained above but any modifications or changes may be within the scope of the invention as long as such changes may be within the subject matter of the invention.

The clutch control device for a hybrid vehicle according to a first aspect of the embodiment of the invention includes an automated manual transmission (AMT) 13 which transmits a rotation of an input shaft 31 adapted to be rotated by an engine torque outputted from an engine 11 mounted on the hybrid vehicle 10 to a drive wheel 16a, 16b of the vehicle by changing a rotation speed of the input shaft 31 to a plurality of speed stages with a plurality of speed change ratios, a motor/generator 12 connected to the drive wheel of the vehicle, a clutch device 14 for engaging the output shaft 17 of the engine with the input shaft 31 of the automated manual transmission 13 or disengaging the output shaft of the engine from the input shaft 31 of the automated manual transmission and controlling a clutch torque Tc transmitted to the input shaft of the automated manual transmission from the output shaft to be a target clutch torque, a clutch actuator 48 including an output rod 64 displaced by an actuator 61 and a master cylinder 65 generating a hydraulic pressure therein by closing an idle port 70 communicating with a reservoir 69 by a displacement of the output rod 64, a slave cylinder 47 in communication with the master cylinder 65 through a communication passage 68 and operated by the hydraulic pressure generated by the master cylinder to operate the clutch device 14 to be in engagement state or disengagement state and a clutch engagement state holding control portion (steps 106, 112 in flowchart) for holding the clutch device to be temporarily in engagement state by operating the master cylinder to be in an idle port opening direction when the disengagement state of the clutch device continues for a predetermined time period.

According to the first aspect of the embodiment, the clutch control device 14 includes the clutch engagement state holding control portion (steps 106 and 112) for holding the clutch device to be temporarily in engagement state by operating the master cylinder 65 to be in an idle port opening direction when the disengagement state of the clutch device continues for a predetermined time period (steps 114 and 116). Accordingly, the clutch torque (Tc) relative to a clutch actuator operating amount (Ma) will not change due to the thermal expansion or the contraction of the operating oil in the communication passage 68 between the master cylinder and the slave cylinder. Thus, an accurate clutch control can be performed.

The clutch control device for the hybrid vehicle according to a second aspect of the embodiment of the invention is characterized in that in addition to the first aspect, the clutch engagement state holding control portion (steps 106 and 112) returns the clutch device 14 from a clutch engagement holding state to a clutch disengagement holding state, after the predetermined time period for the disengagement state of the clutch device passed.

According to the second aspect of the embodiment, the clutch engagement state holding control portion (steps 106 and 112) returns the clutch device from a clutch engagement holding state to a clutch disengagement holding state, after the predetermined time period for the disengagement state of the clutch device passed. The temporal engagement holding of the clutch device would not influence on a normal vehicle running.

The clutch control device for the hybrid vehicle according to a third aspect of the embodiment of the invention is characterized in that in addition to the first or the second aspect, the clutch engagement state holding control portion (steps 106 and 112) holds the clutch device 14 to be in the engagement state under a condition (steps 102 and 104) that the vehicle is stopped (vehicle speed=zero) while the vehicle is running with the motor.

According to the third aspect of the invention, the clutch engagement state holding control portion (steps 106 and 112) holds the clutch device 14 to be in the engagement state under the condition that the vehicle is stopped while the vehicle is running with the motor. Accordingly, the power from the drive wheel side would not be transmitted to the engine side even the clutch device is held to be in the engagement state.

The clutch control device for the hybrid vehicle according to the fourth aspect of the embodiment of the invention is characterized in that in addition to the first or the third aspects above, the clutch engagement state holding control portion (106 and 112) holds the clutch device to be in the engagement state after shifting the automated manual transmission to a neutral position when the vehicle is running with the motor and the engine is rotated for driving auxiliaries of the vehicle.

The clutch control device for the hybrid vehicle according to a fifth aspect of the embodiment of the invention is characterized in that in addition to the second aspect above, the clutch engagement state holding control portion (106 and 112) holds the clutch device to be in the engagement state after shifting the automated manual transmission to be in a neutral position when the vehicle is running with the motor and the engine is rotated for driving auxiliaries of the vehicle.

The clutch control device for the hybrid vehicle according to a sixth aspect of the embodiment of the invention is characterized in that in addition to the fifth aspect above, the automated manual transmission 13 is shifted to a speed stage before shifting to the neutral position after the clutch device has been returned to the clutch disengagement holding state.

The clutch control device for the hybrid vehicle according to a seventh aspect of the embodiment of the invention is characterized in that in addition to the first aspect above, the master cylinder 65 closes the idle port 70 when the clutch device 14 is held to be in the disengagement state.

According to the fourth through seventh aspects of the embodiment of the invention, he clutch engagement state holding control portion (106, 112) holds the clutch device 14 to be in the engagement state after shifting the automated manual transmission 13 to be in a neutral position when the vehicle is running with the motor and the engine is rotated at the same time for driving auxiliaries of the vehicle. Accordingly, the engine torque is not transmitted to the drive wheel 16a and 16b even the engine rotation is transmitted to the automated manual transmission 13 by the holding of the clutch engagement state by the clutch engagement state holding control portion (106 and 112).

The invention claimed is:

1. A clutch control device for a hybrid vehicle comprising:
   an automated manual transmission which transmits a rotation of an input shaft adapted to be rotated by an engine torque outputted from an engine mounted on the hybrid vehicle to a drive wheel of the vehicle by changing a rotation speed of the input shaft to a plurality of speed stages with a plurality of speed change ratios;
   a motor connected to the drive wheel of the vehicle;
   a clutch device for engaging the output shaft of the engine with the input shaft of the automated manual transmission or disengaging the output shaft of the engine from the input shaft of the automated manual transmission and controlling a clutch torque transmitted to the input shaft of the automated manual transmission from the output shaft of the engine to be a target clutch torque;
   a clutch actuator including an output rod displaced by an actuator and a master cylinder generating a hydraulic pressure therein by closing an idle port communicating with a reservoir by a displacement of the output rod;
   a slave cylinder in communication with the master cylinder through a communication passage and operated by the hydraulic pressure generated by the master cylinder to operate the clutch device to be in engagement state or in disengagement state; and
   a clutch engagement state holding control portion for holding the clutch device to be temporarily in engagement state by operating the master cylinder to be moved in an idle port opening direction when the disengagement state of the clutch device continues for a predetermined time period.

2. The clutch control device for a hybrid vehicle according to claim 1, wherein the clutch engagement state holding control portion returns the clutch device from a clutch engagement holding state to a clutch disengagement holding state, after the predetermined time period for the disengagement state of the clutch device passed.

3. The clutch control device for the hybrid vehicle according to claim 2, wherein the clutch engagement state holding control portion holds the clutch device to be in the engagement state after shifting the automated manual transmission to a neutral position when the vehicle is running with the motor and the engine is rotated for driving auxiliaries of the vehicle.

4. The clutch control device for the hybrid vehicle according to claim 3, wherein the automated manual transmission is shifted to a speed stage before shifting to the neutral position after the clutch device has been returned to be in the clutch disengagement holding state.

5. The clutch control device for the hybrid vehicle according to claim 1, wherein the clutch engagement state holding control portion holds the clutch device to be in the engagement state under a condition that the vehicle is stopped while the vehicle is running with the motor.

6. The clutch control device for the hybrid vehicle according to claim 1, wherein the clutch engagement state holding control portion holds the clutch device to be in the engagement state after shifting the automated manual transmission to a neutral position when the vehicle is running with the motor and the engine is rotated for driving auxiliaries of the vehicle.

7. The clutch control device for the hybrid vehicle according to claim 1, wherein the master cylinder closes the idle port when the clutch device is held to be in the disengagement state.

8. The clutch control device for the hybrid vehicle according to claim 1, wherein the clutch engagement state holding control portion holds the clutch device to be temporarily in the engagement state under a condition that the vehicle is running with the motor by moving the master cylinder from a position in which the idle port is closed to a position in which the idle port is open, thereby placing the communication passage in fluid communication with the reservoir in which an operation oil for the clutch device is reserved such that a change of the clutch torque due to thermal expansion or contraction of the operation oil in the communication passage does not occur.

9. A clutch control device comprising:
   an automated manual transmission configured to transmit a rotation of an input shaft to a drive wheel by changing a rotation speed of the input shaft to a plurality of speed stages with a plurality of speed change ratios;
   a clutch device for engaging an output shaft with the input shaft or disengaging the output shaft from the input shaft and controlling a clutch torque transmitted to the input shaft from the output shaft to be a target clutch torque;
   a clutch actuator including an output rod displaced by an actuator and a master cylinder generating a hydraulic pressure therein by closing an idle port communicating with a reservoir by a displacement of the output rod;
   a slave cylinder in communication with the master cylinder through a communication passage and operated by the hydraulic pressure generated by the master cylinder to operate the clutch device to be in engagement state or in disengagement state; and
   a clutch engagement state holding control portion for, when the disengagement state of the clutch device continues for a predetermined time period, holding the clutch device to be temporarily in engagement state by moving the master cylinder from a position in which the idle port is closed to a position in which the idle port is open, thereby placing the communication passage in fluid communication with the reservoir.

10. The clutch control device for a hybrid vehicle according to claim 9, wherein the clutch engagement state holding control portion returns the clutch device from a clutch engagement holding state to a clutch disengagement holding state, after the predetermined time period for the disengagement state of the clutch device passed.

11. The clutch control device for the hybrid vehicle according to claim 10, wherein the automated manual transmission is shifted to a speed stage before shifting to the neutral position after the clutch device has been returned to be in the clutch disengagement holding state.

* * * * *